(No Model.)  3 Sheets—Sheet 2.
H. E. COY.
SCREW CUTTING MACHINE.
No. 448,638. Patented Mar. 24, 1891.
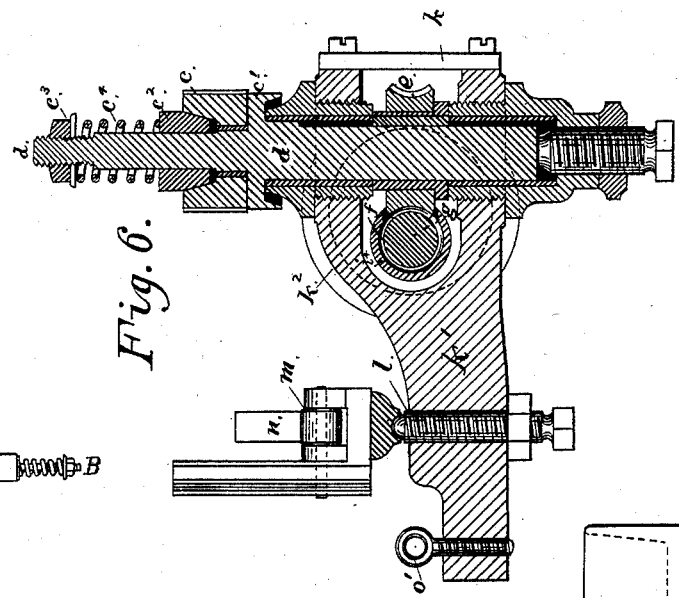
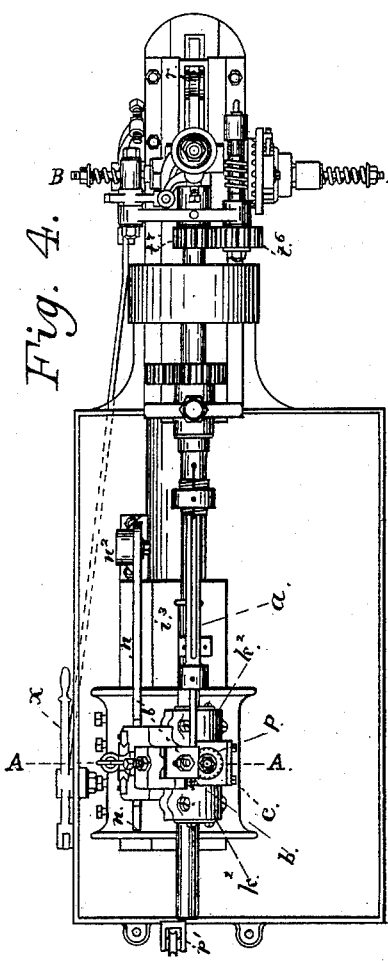
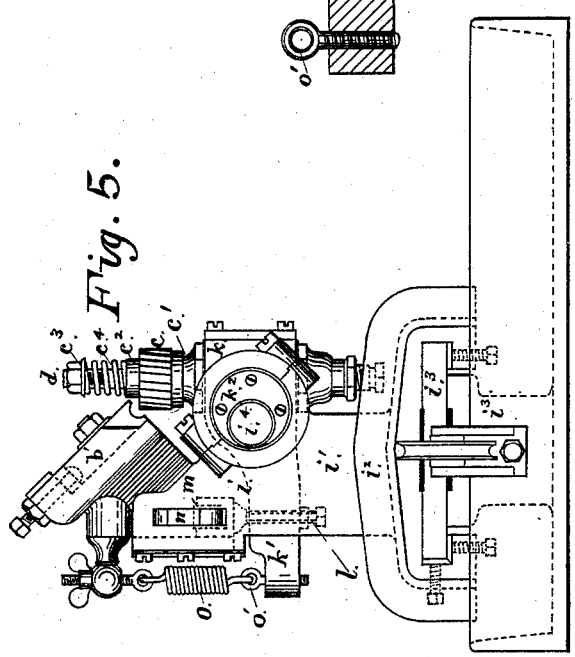
WITNESSES:
INVENTOR
Henry E. Coy
BY
ATTORNEY

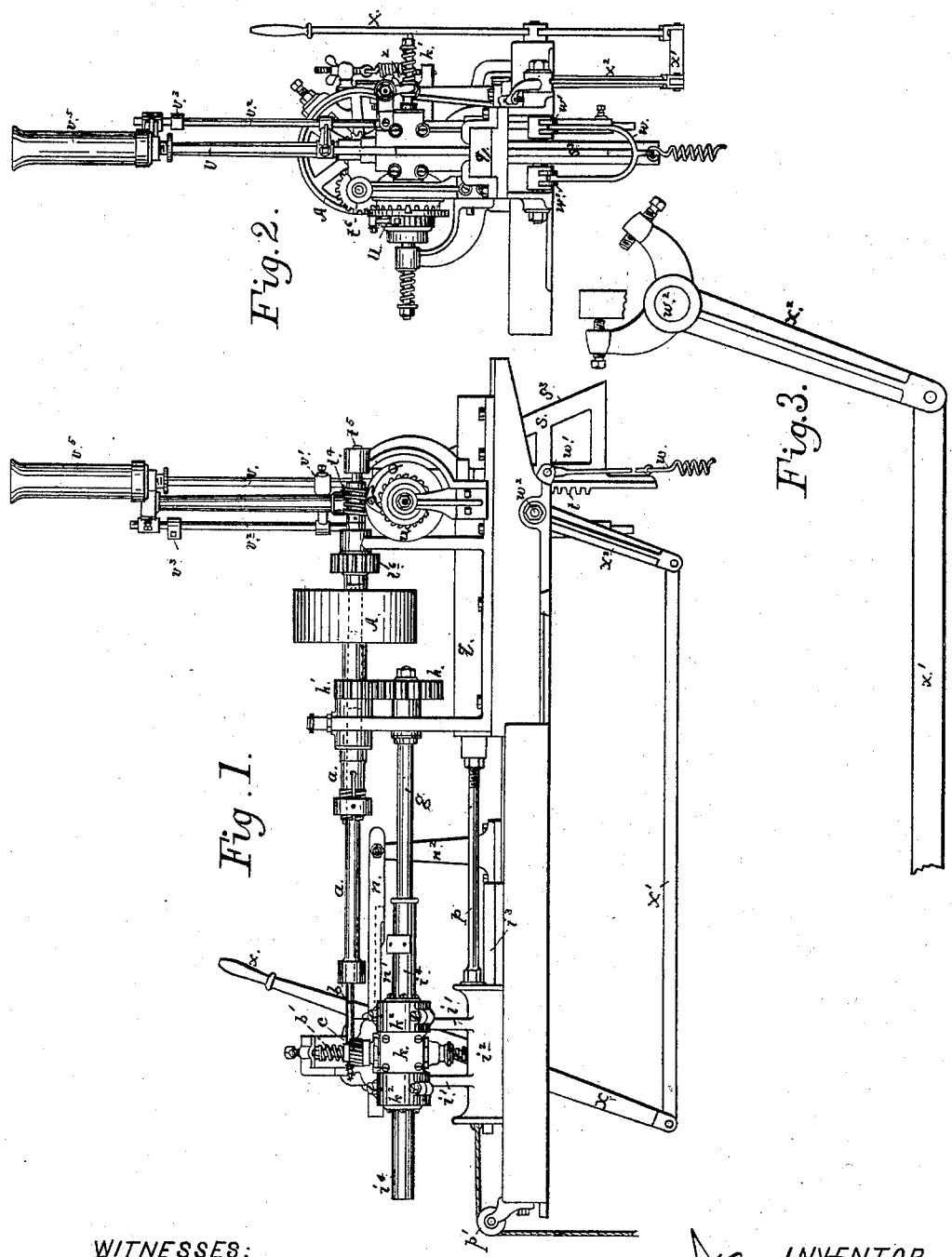

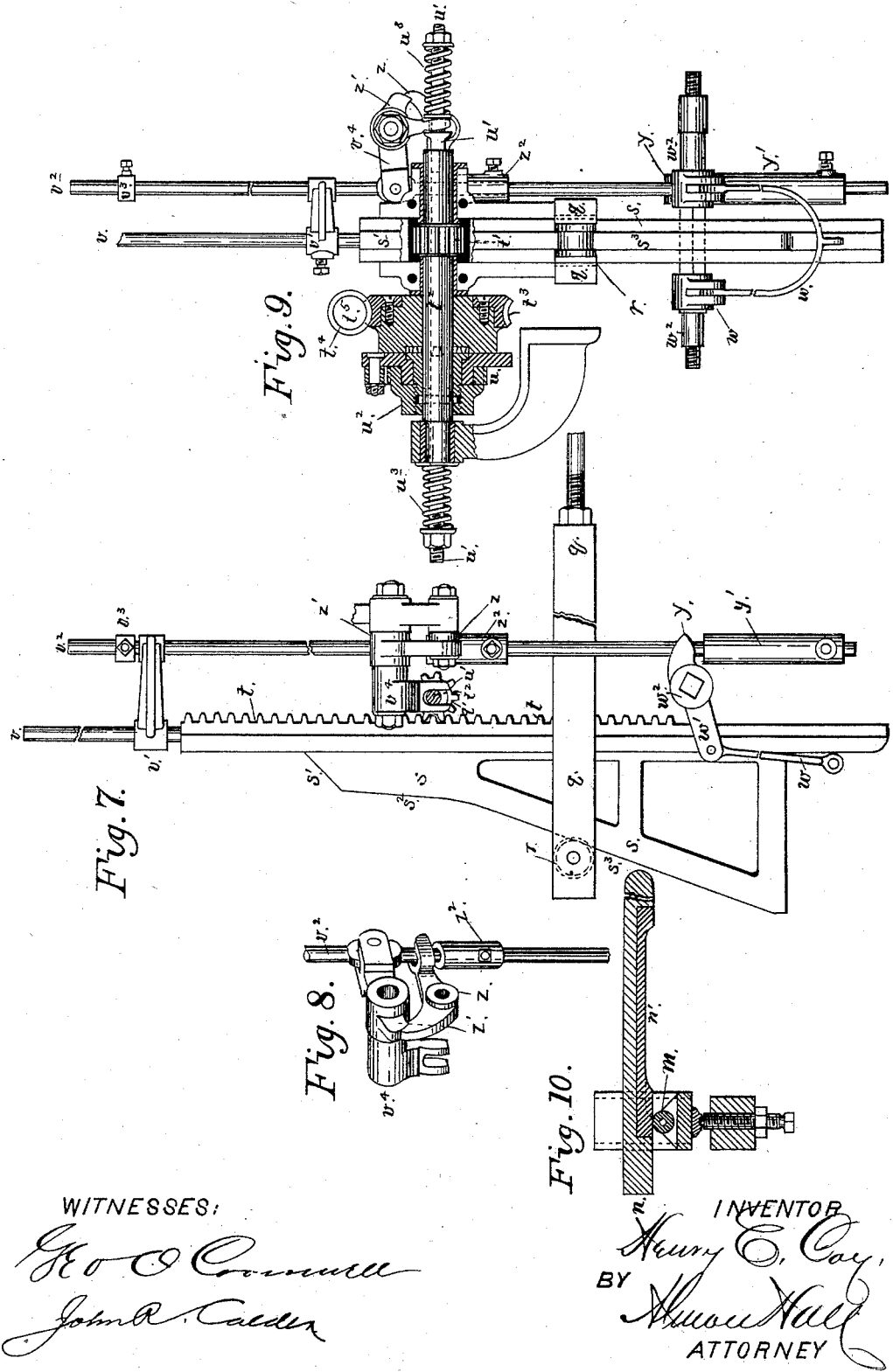

UNITED STATES PATENT OFFICE.

HENRY E. COY, OF TOLEDO, OHIO.

SCREW-CUTTING MACHINE.

SPECIFICATION forming part of Letters Patent No. 448,638, dated March 24, 1891.

Application filed April 11, 1890. Serial No. 347,550. (No model.)

*To all whom it may concern:*

Be it known that I, HENRY E. COY, a citizen of the United States, residing at Toledo, Lucas county, Ohio, have invented certain new and useful Improvements in Screw-Cutting Machines, of which the following is a specification.

My invention relates to that class of screw-cutting machines shown and described in United States Letters Patent granted to me on the 8th day of February, 1887, numbered 357,180; and the objects of my invention are to improve, simplify, and cheapen the device there shown; to provide a rotary toothed cutter of that machine with a forward feed varied and proportioned in its rapidity to the depth of the cut of such cutter and the angle of its line of travel to the axis of the bolt to be cut; to provide means whereby the rotary toothed cutter may be permitted to slip upon its arbor when the strain upon the cutter and its bearings becomes too great, and to so arrange the relative proportions of said cutter and its driving mechanism as to avoid undue strain upon and wear of the parts and dispense with the necessity for clearing the cutter from the bolt before its return to its starting-point. I attain these objects by means of the mechanism hereinafter described, and shown in the accompanying drawings, made part hereof, in which—

Figure 1 is a side elevation of my machine; Fig. 2, an end elevation of the same, viewed from the right in Fig. 1; Fig. 3, a portion of lever designed to start and stop the mechanism provided to give forward feed to the cutter of my machine; Fig. 4, a plan view of my machine; Fig. 5, an enlarged end view of a portion of my machine as seen from the left in Figs. 1 and 4; Fig. 6, an enlarged vertical cross-section on line A A, Fig. 4; Fig. 7, enlarged side view of that part of my machine designed to give a variable forward feed to the rotary cutter, together with tripping device designed to throw into and out of gear the mechanism giving forward feed to the rotary cutter and causing the return of the cutter to its starting-point; Fig. 9, end view of same, partly in cross-section; Fig. 8, tripping-dogs hereinafter referred to in detail; Fig. 10, detail of former, controlling depth of cut of rotary cutter and giving taper to the screw.

Like letters of reference indicate like parts throughout the several views.

My machine is mounted upon a stout frame or table. A spindle $a$, carrying the bolt to be threaded, is provided with a socket to receive the head of bolt $b$, and is driven directly by pulley A. Spindle $a$ is made adjustable longitudinally, so that it may be made longer or shorter, according to the length of bolt to be threaded. Bolt $b$ is braced and prevented from yielding or bending from the pressure of the cutter by means of guide-blocks $b'$ on traveling head $i$. Rotary toothed cutter $c$, which resembles a disk cut transversely from a large multiple-threaded screw, rotates horizontally, the upper corners or angles of the teeth of the cutter forming a series of chasing or cutting edges.

In Figs. 1 and 4 the upper side of bolt $b$ in its revolution moves toward the cutter $c$, which rotates so that the shavings are taken off toward the point or end of the bolt. At the beginning of the operation a blank bolt $b$, to be pointed and threaded, being in place, cutter $c$ is set touching the bolt and so that the circle described by the cutting edges or corners of the teeth of cutter $c$ touches the extended line of the axis of the bolt. Bolt $b$ being caused to revolve on its axis, cutter $c$ is also rotated at such rate of speed that for each revolution of the bolt $b$ cutter $c$ rotates the distance from the face of one of its teeth to the corresponding face of the next tooth, allowing also for the forward travel of cutter $c$. The rotary toothed cutter $c$, besides its rotary motion on its own axis, moves to and fro in the direction of the length of the bolt and moves in the segment of a circle of which the center of trunnion $k^2$, Figs. 1, 4, 5, and 6, hereinafter referred to, is the center. The rotation of the toothed cutter on its own axis causes its chasing or cutting teeth to engage successively the spiral cut or groove as it is formed, so that the bolt and cutter revolve in relation to each other after the manner of worm and worm-wheel in worm-gearing. The motion to and fro of the cutter in the direction of the length of the bolt enables the cutter to travel along the bolt from the point toward the head, cutting the thread as far as may be desired, and then to return to the starting-point. The motion of the cutter in the segment of a circle of which trunnion $k^2$ is the center enables the cutter to approach and recede from the axial line of the bolt $b$, so that the screw is pointed and given any desired taper. At the beginning of its cut, while forming the point upon bolt $b$, the cutter makes a somewhat deeper cut than during the remainder of the operation and travels at an angle from the axis of bolt $b$, so that at this part of the operation the forward travel of the cutter along the bolt must necessarily be slower than when a more shallow cut is made and when the forward travel of the cutter is parallel with the axis of the bolt. The mechanism by means of which these several motions of the cutter, together with its variable forward feed, are obtained I will now proceed to describe.

Cutter $c$ is mounted upon vertical shaft $d$, (see Figs. 1 and 6,) provided with worm-wheel $e$, which engages worm $f$ upon shaft $g$, which worm extends along said shaft as far as the worm-wheel travels, and as far as the bolt is to be cut. Shaft $g$ has a pinion $h$ engaging a corresponding pinion $h'$ on spindle $a$, driven by pulley A. The rotation of the cutter on its own axis is accordingly communicated through train consisting of pulley A, spindle $a$, pinion $h'$, pinion $h$, shaft $g$, worm $f$, worm-wheel $e$, and shaft $d$. Shaft $d$ and worm-wheel $e$ are contained in box $k$, which oscillates in a vertical plane, having for the center of its oscillation trunnions on the sides of box $k$, which are journaled in bearings $k^2$ on head $i$. Box $k$ is provided with an arm $k'$, which engages, by means of screw $l$, a roller $m$, arranged to travel in the direction of the length of the screw to be cut. Arm $k'$ is held in close contact with the carriage of roller $m$ by spring $o$, attached at one end to the traveling head $i$ and at the other end to arm $k'$ by means of eyebolt $o'$. By depressing or elevating roller $m$ box $k$, through its arm $k'$, is tilted, and cutter $c$ is thrown from or toward bolt $b$, as the case may be, thus providing for giving taper to bolt $b$. Plate $n$, Figs. 1, 4, and 10, is a former or roller-guide, upon the under edge of which $n'$ roller $m$ travels. This plate is supported at one end by standard $n^2$ and at the other end by and in an opening in head $i$, through which it passes. Surface $n'$ is designed to give the required size, taper, and general shape to the screw to be cut, the roller $m$ in traveling over surface $n'$ causing cutter $c$ to tilt to or from the bolt $b$, in conformity with the lines and undulations of surface $n'$, without interruption of the rotary or forward movement of the cutter. Head $i$, which supports and carries the oscillating box $k$, with the cutter and its shaft and worm-wheel, together with the guide-block $b$, spring $o$, and one end of former $n$, is mounted upon standards $i'$, projecting upward from carriage $i^2$, which slides to and fro upon shears or way $i^3$.

Head $i$ is provided with projecting sleeves $i^4$, in which slips threaded shaft $g$ and which sleeves serve as a support and guide for the extremity of that shaft and as a protection to its thread or worm against cuttings from bolt $b$. Carriage $i^2$ is provided with rod $p$, leading and attached to sliding bar $q$, which rod and bar may be regarded as part of the carriage, being in line therewith and all sliding to and fro together. Bar $q$ at its outer extremity is split, and in the cleft near the end of the bar is placed roller $r$. In the cleft of bar $q$ is placed vertically a cam or frame $s$, having three sides or, rather, edges, being in general outline triangular, the edge nearest the carriage $i^2$ being vertical, the bottom horizontal, and the remaining edge a line at varying angles to the vertical, and against which roller $r$ rests. The raising of frame $s$ vertically causes roller $r$ to travel along the inclined planes of the frame, pulling with it bar $q$, rod $p$, carriage $i^2$ and its appendages, giving forward horizontal travel to the cutter $c$ along bolt $b$. The more obtuse the angle to the vertical of the plane presented to roller $r$ the more rapid will be the motion of the roller $r$ and its train of appendages horizontally, and the more acute the angle the slower will be the roller's forward travel. Thus it will be seen that with the frame $s$ moving vertically at a uniform rate of speed, the motion imparted to roller $r$ horizontally may be varied as desired by variation of the angles of the inclined planes upon which the roller travels. In the drawings, Fig. 7, face $s'$ is at such angle to the vertical as will cause roller $r$, with its attachments, to advance rapidly, bringing the cutter forward against the end of the blank bolt. Face $s^2$ then causes the cutter to advance slowly while the cutter is forming the point of the screw and moving at an angle away from the axis of the bolt; then face $s^3$ advances the cutter more rapidly while the thread is forming on the bolt. The lift of frame $s$ is obtained by means of a rack $t$, Figs. 1 and 7, on its vertical edge, engaged by a pinion $t'$, Figs. 7 and 9, fixed on shaft $t^2$, which shaft is caused to revolve by a worm-wheel $t^3$, Figs. 1, 2, 4, and 9, driven by worm $t^4$ on shaft $t^5$, having pinion $t^6$, which engages pinion $t^7$ on the driving-shaft of the machine. (See Fig. 4.) Worm-wheel $t^3$, Fig. 9, is loose on its shaft, but is provided with a clutch $u$, Figs. 1, 2, and 9, which revolves with and slides upon its shaft $t^2$. Clutch $u$ is thrown into and out of gear by means of rod $u'$, passing through and moving longitudinally in shaft $t^2$, which is hollow. Rod $u'$ is provided with a spur $u^2$, which projects through a longitudinal slot in shaft $t^2$, engaging and carrying with it clutch $u$. Coiled springs $u^3$ upon rod $u'$ serve to hold the rod in place, though permitting its motion longitudinally. Frame $s$ being at its lowest point and clutch $u$ being thrown into gear, the frame $s$ is lifted to the desired height by means of rack and pinion $t\,t'$. When the frame $s$ has been lifted a suitable distance, the clutch $u$ is automatically disengaged from worm-wheel $t^3$, permitting frame $s$ to fall by its own weight to its starting-point, reversing the motion of shaft $t^2$ and clutch $u$ during its fall.

At the top of plate $s$ is fixed vertical rod $v$, provided with a movable finger $v'$, which may be set at any desired point on the rod. This finger embraces loosely vertical rod $v^2$, which carries a collar $v^3$, adapted to be set at any point on its rod. Rod $v^2$ is loosely attached pivotally to one arm of a bell-crank lever $v^4$, the other arm of which is forked and embraces rod $u'$, working against a shoulder on the rod $u'$. When frame $s$ has carried its rod $v$ to a proper height, finger $v'$ strikes collar $v^3$ on rod $v^2$, the horizontal arm of lever $v^4$ is lifted, and the vertical arm pushes rod $u'$, which disengages clutch $u$. Thus it will be seen the release of the clutch may be obtained at any point in the operation of cutting the bolt by adjustment of finger $v'$ and collar $v^3$ on their respective rods, permitting the frame $s$ to fall to its starting-point. As frame $s$ falls, carriage $i^2$, with its attachments, is drawn back to its starting-point by means of a spring or cord and weight $p'$, as indicated at extreme left of Fig. 1. For the purpose of preventing the concussion and jar resulting from the fall of frame $s$, rod $v$ at its upper end is provided with a piston moving in a dash-pot $v^5$, in the usual manner.

At its lowest point frame $s$ rests in loop or stirrup $w$, Figs. 1, 2, 7, and 9, suspended from arms $w'$, projecting radially from shaft $w^2$. This shaft is oscillated by means of lever $x$, Figs. 1, 2, and 4, provided with connecting-rod $x'$, which is pivoted at one end to the lever and at its other end to arm or crank $x^2$ on shaft $w^2$. (See Fig. 3.) Upon shaft $w^2$ is a radially-projecting lug $y$, (see Figs. 7 and 9,) which when depressed by the rotation of its shaft engages a collar $y'$ on the lower end of rod $v^2$. To start the cutter forward, the operator throws to the left, Fig. 1, the upper end of lever $x$, which, through rod $x'$, arm $x^2$, shaft $w^2$, lug $y$, and rod $v^2$, pulls down the horizontal arm of bell-crank lever $v^4$, causing its vertical arm to pull clutch $u$ into gear by means of rod $u'$. By the same movement of lever $x$ stirrup $w$, through rod $x'$, arm $x^2$, shaft $w^2$, and arms $w'$, is lifted, carrying with it frame $s$, which by this rapid lift, through face $s'$ and roller $r$, pulls carriage $i^2$, with the cutter $c$, quickly forward to the end of bolt $b$, so that cutting is begun without loss of time. This rapid upward lift of frame $s$ is permitted notwithstanding clutch $u$ is in gear, the clutch being adapted to run free, when rotated rapidly through rack and pinion $t$ $t'$, by lifting frame $s$. For the purpose of holding clutch $u$ in gear until released by the throw of bell-crank lever $v^4$, I provide a dog $z$, (see Figs. 2, 7, 8, and 9,) pivoted near its middle, one end of which has a notch which engages the lug $z'$ on bell-crank lever $v^4$, the other end being forked and engaging loosely rod $v^2$. On this rod, immediately below dog $z$, is a collar $z^2$, secured to rod $v^2$, so that when rod $v^2$ is lifted collar $z^2$ strikes the forked extremity of dog $z$, causing its notched end to tilt downward, releasing lug $z'$ on bell-crank lever $v^4$, which, through rod $u'$, releases clutch $u$. When rod $v^2$ is pulled downward, pulling clutch $u$ into gear, lug $z'$ is raised and dog $z$ tilts back, so that its notch again engages the lug on the bell-crank lever $v^4$, which, with the clutch $u$, is thus held securely in place until the dog is again tripped by the lifting of rod $v^2$. When frame $s$ falls, and while carriage $i^2$ with its load is traveling back to its starting-point, drawn by cord and weight $p'$, worm-wheel $e$, Fig. 6, rolls upon worm $f$ on shaft $g$ as a pinion rolls upon a fixed rack, and in like manner cutter $c$ rolls upon bolt $b$, the teeth of the cutter falling into the spiral groove cut upon the now completed screw. To admit of this backward travel of carriage $i^2$ and the backward revolution of cutter $c$ and worm-wheel $e$, as well as to prevent undue strain and wear upon and the stripping of these parts, it is necessary that the lead of the threads on shaft $g$ and screw $b$ shall be substantially the same in each—in other words, that the relation of worm-gear $e f$ and bolt and cutter $b c$ to each other shall permit the worm-wheel and cutter to roll together upon the same shaft upon their respective screws as pinions roll upon fixed racks. It will be seen, however, that while the point of the screw is being cut and while the cutter is moving at an angle to the axis of bolt $b$ the harmony of movement between cutter $c$ and worm $e$ is slightly broken. To obviate this difficulty and to prevent undue strain or wear upon the cutter or the worm-gearing $e f$ during this part of the operation, cutter $c$ is adapted, when the strain becomes too great, to slip upon its arbor, and thus to adjust itself to the thread it is cutting. To accomplish this, cutter $c$ runs loose on its arbor and is pressed against its seat $c'$ by a friction-block $c^2$, between which and a regulating-nut $c^3$ at the top of shaft $d$ is interposed spring $c^4$. By means of nut $c^3$ pressing on friction-block $c^2$ through spring $c^4$, adjustment of friction is had and any required degree of rigidity of the cutter on its bearings is obtained. The same results may be obtained by applying the friction device to worm-wheel $e$ or to pulley $h'$; but I prefer the method here shown.

Means for dispensing with any motion of my cutter save the rotary motion will suggest themselves to skilled mechanics, it being quite practicable to cause bolt $b$ to advance and recede longitudinally and laterally at a variable rate of speed while the thread is forming. A rotary cam or other mechanism for transforming a motion of uniform speed to a motion of irregular speed may also be substituted for the reciprocating frame $s$; but such mechanism would obviously be the mechanical equivalent of the herein-described device, and I do not therefore limit my invention to the variable feed of the cutter alone, nor to a particular device for imparting a variable rate of feed thereto.

Having fully described my machine and the mode of constructing and operating the same, what I claim as my invention, and desire to secure by Letters Patent, is—

1. A screw-cutting machine having the rotary toothed cutter $c$, adapted, by means of the mechanism substantially as described, to feed in the direction of the length of the bolt to be cut at a variable rate of speed, substantially as shown and described, and for the purpose specified.

2. In a screw-cutting machine, the rotary toothed cutter and its supporting mechanism, substantially as described, in combination with the frame or cam having a face or faces adapted to give forward motion to such cutter at a variable rate of speed, substantially as shown and described, for the purpose specified.

3. In a screw-cutting machine, the cam or frame $s$, having face $s'$, adapted to bring the cutter rapidly forward to the end of the bolt, face $s^2$, adapted to cause the cutter to move slowly forward while the point on the screw is forming, and face $s^3$, adapted to cause the cutter to advance more rapidly during the remainder of the cut, substantially as shown and described, for the purpose specified.

4. In a screw-cutting machine, the rotary toothed cutter and its carriage, in combination with cam or frame $s$, having rack $t$, and the train of gearing intermediate the driving-pulley of said machine and said rack, substantially as shown and described, for the purpose specified.

5. In a screw-cutting machine, the rotary toothed cutter $c$ and its train of gearing intermediate said cutter and the driving-pulley, in combination with the cam or frame $s$ and its train of gearing intermediate said cam or frame and the driving-pulley of said machine, substantially as shown and described, for the purpose specified.

6. In a screw-cutting machine, the rotary cutter and its carriage, the cam or frame adapted to give forward motion to such cutter, and a clutch in the train of gearing intermediate said cam or frame and the driving-pulley of said machine, in combination with suitable tripping mechanism adapted to disengage said clutch when said cutter has completed its cut, whereby said carriage and cam or frame are permitted to return to their starting-point, substantially as shown and described, for the purpose specified.

7. In a screw-cutting machine, the rotary cutter and its carriage, the cam or frame adapted to give forward motion to said cutter, and a clutch in the train of gearing actuating said cam or frame, in combination with a hand-lever adapted to simultaneously start said cam or frame forward and to throw into gear said clutch, substantially as shown and described, for the purpose specified.

8. In a screw-cutting machine, the rotary cutter $c$ and cam or frame $s$, in combination with bell-crank lever $v^4$, adapted through adjustable connections intermediate said lever and said cam or frame to throw into or out of gear a clutch in the train of gearing actuating said cam or frame, substantially as shown and described, for the purpose specified.

9. In a screw-cutting machine, the rotary toothed cutter $c$, adapted, by means of the mechanism substantially as described, to advance toward and recede from bolt $b$ laterally, the former $n$, and the mechanism intermediate said former and said cutter, in combination with the cam or frame $s$, adapted, by means of the mechanism substantially as described, to impart forward motion to said cutter at a variable rate of speed, substantially as shown and described, for the purpose specified.

10. In a screw-cutting machine, the rotary toothed cutter having in its driving-gear a worm-wheel, said cutter being adapted, by means of the mechanism substantially as described, to cut a thread of such lead that said cutter and said worm-wheel may roll together, each upon its own screw, as a pinion upon a fixed rack, substantially as shown and described, for the purpose specified.

11. In a screw-cutting machine, the rotary toothed cutter $c$, adapted, by means of the mechanism substantially as described, to slip upon its bearings, substantially as shown and described, for the purpose specified.

12. In a screw-cutting machine, the combination of the rotary toothed cutter $c$ with seat $c'$, friction-block $c^2$, adjusting-nut $c^3$, and spring $c^4$, substantially as shown and described, for the purpose specified.

13. In a screw-cutting machine, the rotary toothed cutter adapted, by means of the mechanism substantially as described, to slip upon its bearings and to cut a thread of substantially the same lead as the worm-gear in its driving mechanism, substantially as shown and described, for the purpose specified.

14. In a screw-cutting machine, the rotary toothed cutter $c$, adapted, by means of the mechanism substantially as described, to slip on its bearings and to cut a thread of the same lead as the lead of the worm-gear in its driving mechanism, in combination with the cam or frame $s$, adapted, by means of the mechanism substantially as described, to give variable forward feed to said cutter, substantially as shown and described, for the purpose specified.

15. In a screw-cutting machine, the rotary toothed cutter $c$, adapted, by means of the mechanism substantially as described, to slip on its bearings and to cut a thread uniform in its lead with the lead of the worm-gear in its driving mechanism, in combination with the cam or frame *s*, adapted, by means of the mechanism substantially as described, to give a variable forward feed to said cutter, and the former *n*, adapted, by means of its cconformation, to give lateral motion to said cutter and suitable taper to the finished screw, substantially as shown and described, for the purpose specified.

16. In a screw-cutting machine, the rotary toothed cutter *c*, in combination with worm-gearing *e f*, the worm *f* having the same lead as the screw-thread designed to be cut by said cutter and said worm extending along its shaft as far as the screw is designed to be cut, substantially as shown and described, for the purpose specified.

17. In a screw-cutting machine, the rotary toothed cutter *c* and its carriage, in combination with the cam or frame *s*, adapted, by means of the mechanism substantially as described, to give a variable forward feed to said cutter, and cord and weight $p'$, adapted, by means of the mechanism substantially as described, to draw said carriage back to its starting-point upon its release from the pull of said cam or frame, substantially as shown and described, for the purpose specified.

18. In a screw-cutting machine, the rotary toothed cutter *c*, adapted, by means of the mechanism substantially as described, to slip on its bearings and to cut a thread of the same lead as the lead of its driving worm-gear, in combination with pulley A and the train of gearing intermediate said pulley and said cutter, spindle *a*, brace and guide-block $b'$, cam or frame *s*, having faces $s'$, $s^2$, and $s^3$, and the train of gearing actuating said cam or frame, the tripping mechanism adapted, by means of the mechanism substantially as described, to release said frame from its said train of gearing, lever *x*, adapted, by means of the mechanism substantially as described, to engage said frame with its train of gearing, and cord and weight $p'$, substantially as shown and described, for the purpose specified.

HENRY E. COY.

Witnesses:
GEO. O. CORNWELL,
ALMON HALL.